No. 667,037. Patented Jan. 29, 1901.
C. RICHTER & R. T. ESCHLER.
SHAFT BEARING.
(Application filed Aug. 12, 1899.)
(No Model.)
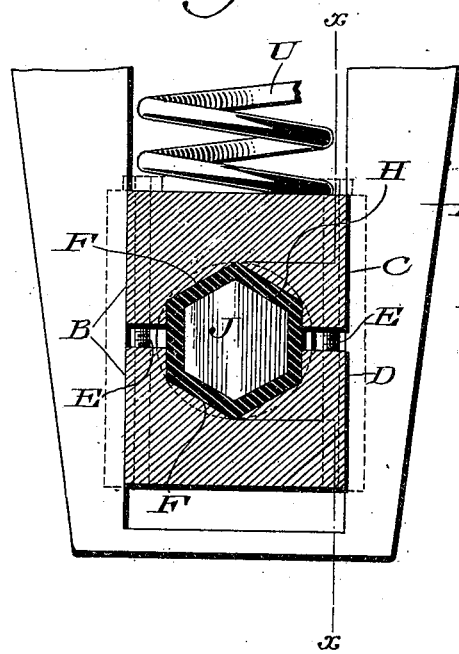
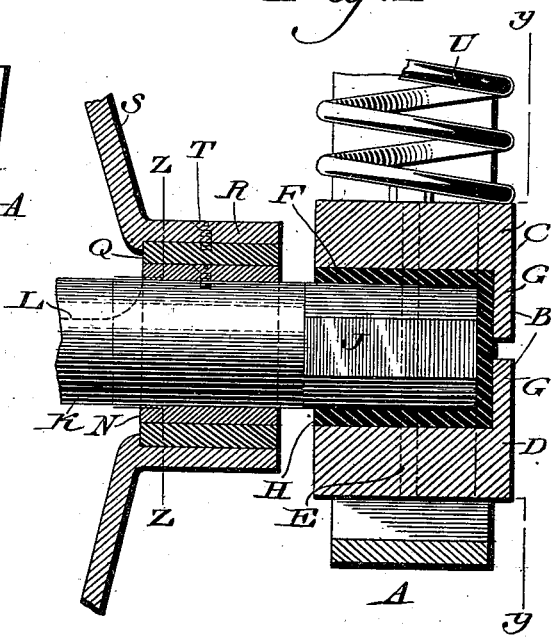
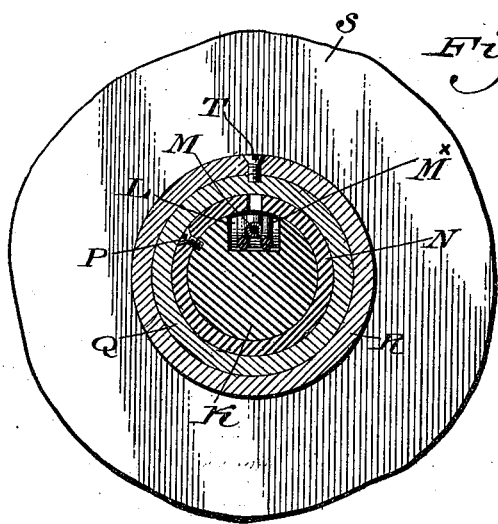
Witnesses
P. H. Aagles.
L. Douville.
Inventors
Charles Richter,
By Richard T. Eschler,
Wiedersheim & Fairbanks
Attorneys

UNITED STATES PATENT OFFICE.

CHARLES RICHTER AND RICHARD T. ESCHLER, OF CAMDEN, NEW JERSEY.

SHAFT-BEARING.

SPECIFICATION forming part of Letters Patent No. 667,037, dated January 29, 1901.

Application filed August 12, 1899. Serial No. 726,992. (No model.)

*To all whom it may concern:*

Be it known that we, CHARLES RICHTER and RICHARD T. ESCHLER, citizens of the United States, residing in the city and county of Camden, State of New Jersey, have invented a new and useful Improvement in Shaft-Bearings for Traction-Motors, which improvement is fully set forth in the following specification and accompanying drawings.

Our invention relates to an improved construction of a shaft-bearing for a traction-motor, wherein provision is made for cushioning and reducing to a minimum any excessive vibrations, means also being provided for carrying wires and oiling devices in said shaft.

It consists of novel details of construction, all as will be hereinafter fully set forth, and particularly pointed out in the claim.

Figure 1 represents a sectional view of a shaft-bearing for a traction-motor embodying our invention, the section being taken on line $x\,x$, Fig. 2. Fig. 2 represents a section on line $y\,y$, Fig. 1. Fig. 3 represents a section on line $z\,z$, Fig. 1.

Similar letters of reference indicate corresponding parts in the figures.

Referring to the drawings, A designates a hanger or bracket, in which is contained the box B, the same consisting of the sections C and D, which are held in assembled position by means of the bolts E or other suitable fastening devices, said box being provided with polygonal recesses F, which are terminated by the wall G, said recesses being juxtaposed, as will be understood from Fig. 2, and having seated therein a ring or cushion H, of rubber or other resilient material, said ring being of polygonal shape and having its sides of the same contour as said recesses and adapted to receive the polygonal-shaped end J of the shaft K, which latter is provided with a recess or slot L therein, the extent of which can be understood from Figs. 1 and 3, said recess or slot carrying oiling devices M and wires $M^\times$.

N designates a case-hardened sleeve fastened to the shaft K by a suitable fastening device P, the head of which is flush with the periphery of said sleeve. It will of course be evident that any number of fastening devices may be employed.

Q designates a hardened sleeve, which is fastened to the hub R of the wheel S by means of a suitable fastening device T. It will of course be evident that any number of fastening devices may be employed.

U designates a spring or other tension device bearing upon the member C of the split box B.

The operation is as follows: The shaft K, which is stationary, is held in fixed position by the engagement of the polygonal end J with the surrounding rubber ring or cushion H, which latter can be compressed between the box-sections to the desired extent by tightening the bolts E, as is evident, wherefrom it will be seen that a simple and effective cushioning device is provided, provision being at the same time made for preventing rotation of the shaft K, said device being readily accessible for the purposes of inspection and repairs and not liable to get out of order. The case-hardened sleeve N, which is rigidly secured to the shaft K, serves as a bearing for the wheel S and the hardened sleeve Q, which is secured thereto and rotates in unison therewith.

It will thus be seen that by the foregoing provision is made for reducing jars or concussions to a minimum and means are also provided for furnishing a cheap and effective bearing.

Having thus described our invention, what we claim as new, and desire to secure by Letters Patent, is—

The combination of a split box, means for holding the sections of said box in juxtaposition, said sections being provided with a polygonal recess, a resilient ring held in said recess, and a shaft having a polygonal end seated in said ring, whereby rotation of said shaft is prevented and vibrations are reduced to a minimum.

CHARLES RICHTER.
RICHARD T. ESCHLER.

Witnesses:
JOHN A. WIEDERSHEIM,
WM. CANER WIEDERSHEIM.